United States Patent [19]

Headley

[11] Patent Number: 5,573,271
[45] Date of Patent: Nov. 12, 1996

[54] SIDE IMPACT AIR BAG INFLATOR

[75] Inventor: Paul S. Headley, Mesa, Ariz.

[73] Assignee: TRW Inc., Lyndhurst, Ohio

[21] Appl. No.: 342,367

[22] Filed: Nov. 18, 1994

[51] Int. Cl.$^6$ .................................................. B60R 21/28
[52] U.S. Cl. ........................ 280/741; 280/736; 280/730.2
[58] Field of Search .................................... 280/737, 741, 280/736, 740, 728.1; 222/3, 5

[56] References Cited

U.S. PATENT DOCUMENTS

| | | | |
|---|---|---|---|
| 3,232,481 | 2/1966 | Hebenstreit | 222/3 |
| 3,895,821 | 7/1975 | Schotthoefer et al. | 222/5 |
| 5,016,914 | 5/1991 | Faigle et al. | |
| 5,031,932 | 7/1991 | Frantom et al. | |
| 5,230,531 | 7/1993 | Hamilton et al. | 280/737 |
| 5,263,740 | 11/1993 | Frey et al. | |
| 5,301,979 | 4/1994 | Allard | |
| 5,330,730 | 7/1994 | Brede et al. | |
| 5,333,899 | 8/1994 | Witte | 280/730.2 |

*Primary Examiner*—Eric D. Culbreth
*Attorney, Agent, or Firm*—Tarolli, Sundheim, Covell, Tummino & Szabo

[57] ABSTRACT

A side impact air bag inflator (14) includes an elongated tubular member (40) having an open end (52), a closed end portion (44), and a cylindrical portion (42) with a uniform inner diameter (d1) and a plurality of outlet openings (38). A rupturable closure wall (82) is fixed to the tubular member (40) at a location axially between the outlet openings (38) and the closed end portion (44). Inflation fluid is contained under pressure within the tubular member (40) between the closure wall (82) and the closed end portion (44). An initiator (100) has a cylindrical casing (106) extending coaxially within the tubular member (40) at a location axially between the closure wall (82) and the open end (52). A circular base (102) of the initiator (100) closes the open end (52).

17 Claims, 3 Drawing Sheets

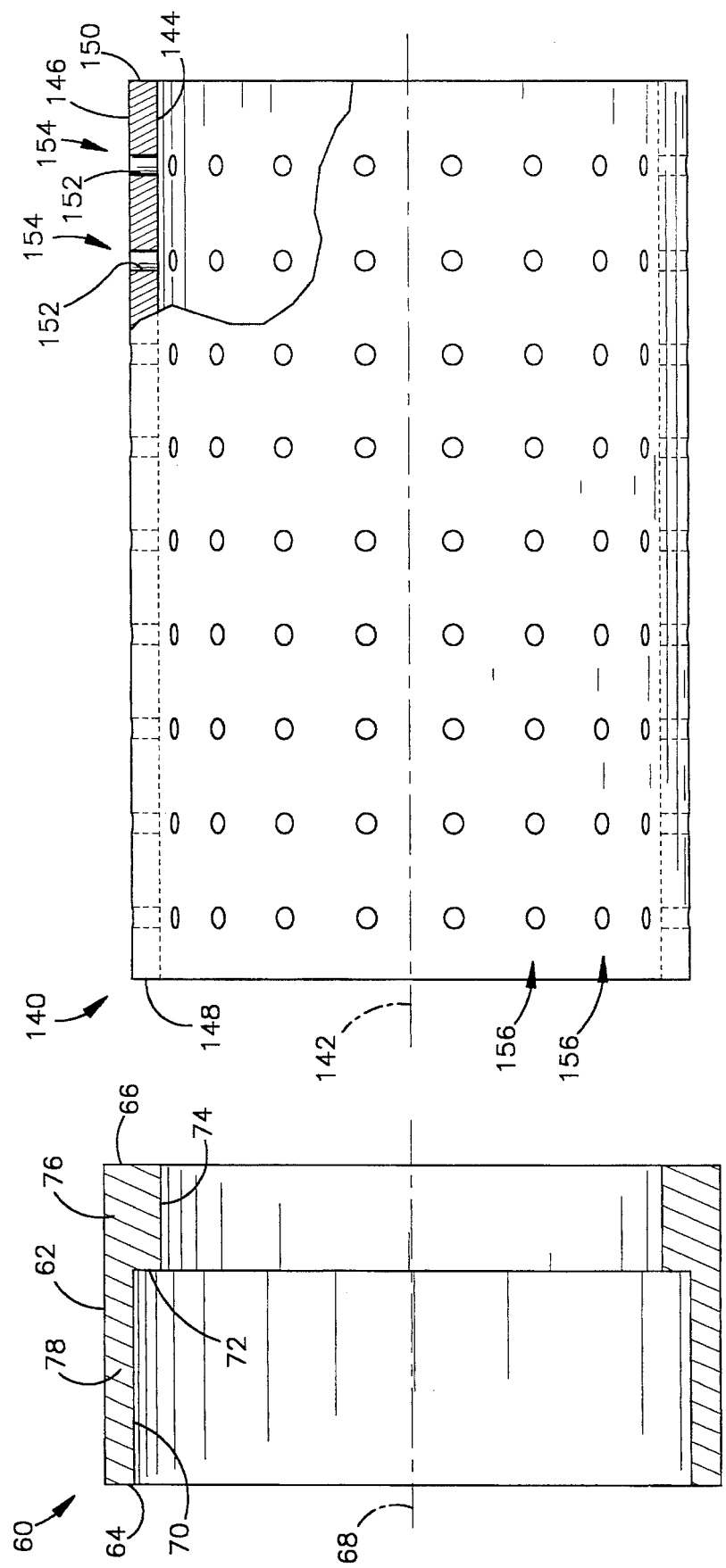

5,573,271

SIDE IMPACT AIR BAG INFLATOR

FIELD OF THE INVENTION

The present invention relates to an inflator for inflating an inflatable vehicle occupant restraint, such as an air bag, and particularly relates to an inflator for inflating an air bag in a vehicle upon the occurrence of a side impact collision.

BACKGROUND OF THE INVENTION

An inflatable vehicle occupant restraint, such as an air bag, is inflated in a vehicle upon the occurrence of a vehicle collision. The air bag is typically stored in an uninflated condition in an air bag module. The module may be mounted on any one of several different parts of the vehicle, such as the steering column or the instrument panel. When the vehicle experiences a collision, the air bag is inflated outward from the module and into the vehicle occupant compartment. The air bag then restrains movement of a vehicle occupant toward the part of the vehicle upon which the module is mounted.

If the air bag is intended to restrain a vehicle occupant upon the occurrence of a side impact collision, the module is mounted at the side of the vehicle. Specifically, the module is mounted in a position to direct the inflating air bag between the occupant and an adjacent door. The module may thus be mounted, for example, on the door, on an adjoining pillar, on the seat, or on the floor beside the seat. However, the space available for the air bag module on these parts of the vehicle may be relatively small. Therefore, it may be necessary for the size of an air bag module at the side of the vehicle to be relatively small.

SUMMARY OF THE INVENTION

In accordance with the present invention, an apparatus for inflating an inflatable vehicle occupant restraint comprises an elongated tubular member. The tubular member has a longitudinal central axis and an annular end surface. The end surface defines an open end of the tubular member which is centered on the axis. The tubular member further has a closed end portion and a cylindrical portion extending axially from the open end to the closed end portion. The cylindrical portion of the tubular member has a plurality of outlet openings.

A rupturable closure wall is supported within the cylindrical portion of the tubular member at a location axially between the outlet openings and the closed end portion. The closure wall is fixed to the tubular member. A quantity of inflation fluid is contained under pressure within the tubular member between the closure wall and the closed end portion.

The apparatus further comprises an initiator means for releasing the inflation fluid to flow outward through the outlet openings. The initiator means includes a casing containing pyrotechnic material which, when ignited, produces combustion products which rupture the closure wall. The casing extends within the tubular member at a location axially between the closure wall and the open end of the tubular member. The apparatus also has means for closing the open end of the tubular member.

In a preferred embodiment of the present invention, the casing is cylindrical and defines boundaries of a fluid flow space within the cylindrical portion of the tubular member. The fluid flow space extends axially from the closure wall to the casing, and extends radially from the casing to the outlet openings. The inflation fluid is released to flow throughout the fluid flow space when the closure wall is ruptured.

Moreover, the combustion products emitted from the casing include hot particles, and the apparatus in the preferred embodiment of the present invention further comprises filter means for blocking the passage of such particles through the outlet openings. The filter means comprises a tubular cylindrical filter located in the fluid flow space concentrically between the casing and the cylindrical portion of the tubular member. The initiator means further has a circular base from which the casing projects axially. The circular base extends across the open end of the tubular member to close the open end. The fluid flow space extends axially from the circular base to the closure wall. The filter extends axially from the circular base to a support member which supports the closure wall in the tubular member.

The foregoing features of the present invention provide an inflator with a relatively simplified structure in comparison with the structures of similar inflators known in the prior art. Therefore, the inflator can be made relatively smaller in comparison with such prior art inflators. For example, the tubular member, which contains the closure wall, the inflation fluid and the initiator casing, preferably has a uniform inner diameter along its length from the open end to the closed end portion. This structure is substantially less complex than comparable structures known in the prior art.

Furthermore, the fluid flow space that is defined within the tubular member between the closure wall and the outlet openings is preferably defined in part by the cylindrical initiator casing. In the prior art, such a fluid flow space is typically defined in part by a sleeve-like structure or other parts that support the initiator casing in a position adjacent to the closure wall. The structure of the inflator constructed in accordance with the present invention preferably does not use or need such parts, and is simplified accordingly.

The simplified structure of the inflator constructed in accordance with the present invention enables it to be used more efficiently in an apparatus that inflates an air bag upon the occurrence of a side impact vehicle collision. Such an apparatus typically inflates the air bag at a location between a vehicle occupant and an adjacent vehicle door. Therefore, the inflator and the air bag are mounted together at the side of the vehicle, such as on the vehicle door, on an adjoining pillar, on the seat, or on the floor beside the seat. The relatively small size of the inflator constructed in accordance with the present invention enables it to be mounted more easily at any one of these locations.

BRIEF DESCRIPTION OF THE DRAWINGS

Further features of the present invention will become apparent to those skilled in the art to which the present invention relates from reading the following description with reference to the accompanying drawings, in which:

FIG. 4 is a view of a part shown in FIG. 3; and

FIG. 5 is a view of another part shown in FIG. 3.

DESCRIPTION OF A PREFERRED EMBODIMENT

Figure 1:
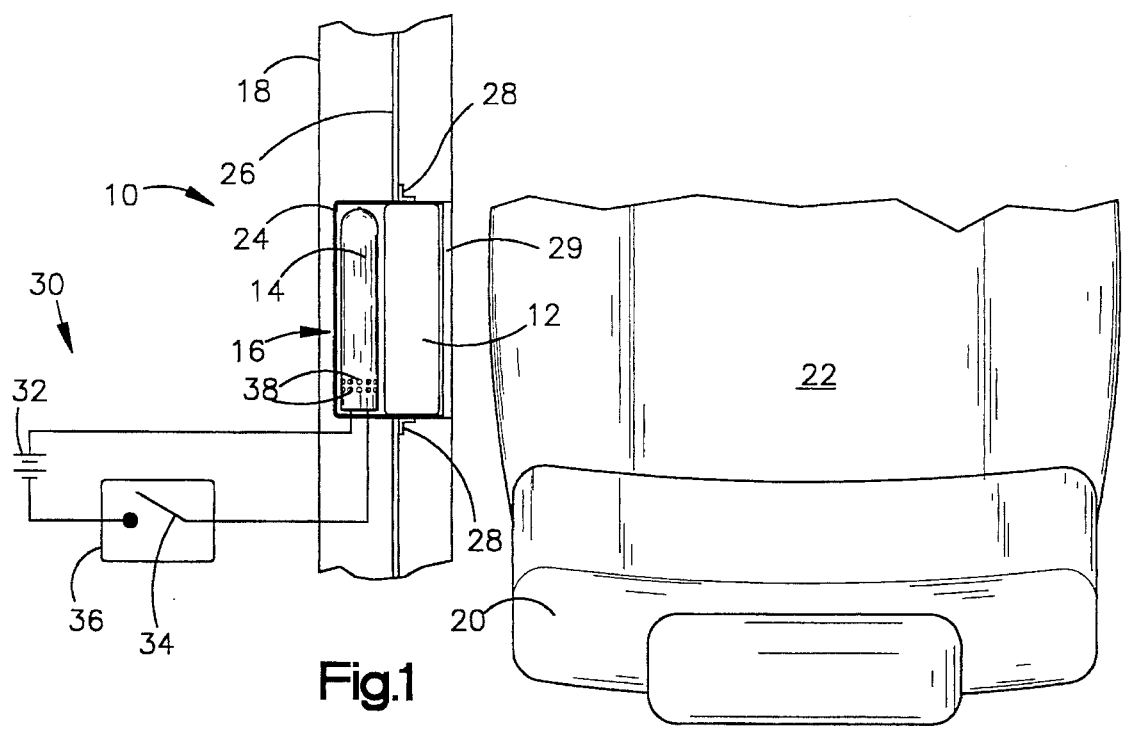
FIG. 1 is a schematic view showing parts of a vehicle and a vehicle occupant restraint apparatus comprising a preferred embodiment of the present invention.
Figure 2:
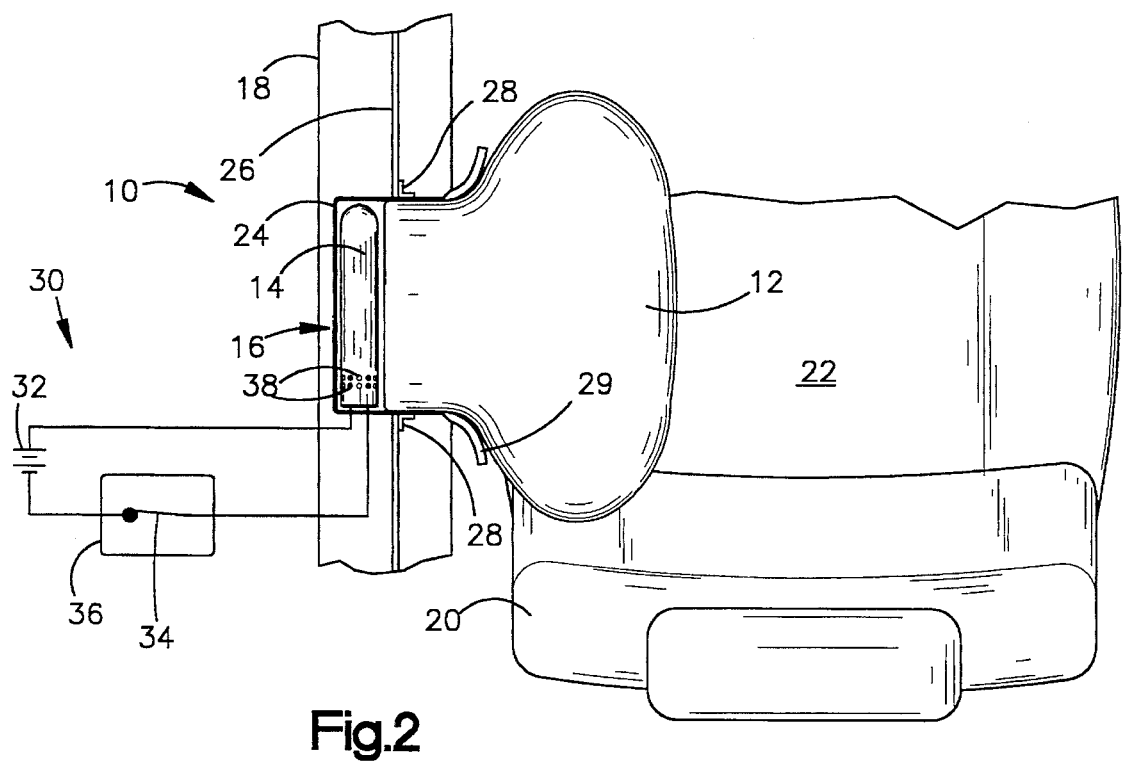
FIG. 2 is a schematic view showing the apparatus of FIG. 1 in an actuated condition.

A vehicle occupant restraint apparatus 10 comprising a preferred embodiment of the present invention is shown schematically in FIGS. 1 and 2. The apparatus 10 includes an inflatable vehicle occupant restraint 12, which is commonly referred to as an air bag, and an inflator 14 for inflating the air bag 12. The air bag 12 and the inflator 14 are parts of an air bag module 16 which is mounted on a vehicle door 18 adjacent to a seat 20 in the vehicle occupant compartment 22.

The module 16 includes a reaction canister 24 which contains the air bag 12 and the inflator 14. The reaction canister 24 is mounted on a structural panel 26 of the door 18 by welded brackets 28 or the like. A rupturable deployment door 29 conceals the air bag 12 from the vehicle occupant compartment 22. The deployment door 29 can be a part of the module 16 or a part of the door 18, and may comprise any suitable structure known in the art.

The inflator 14 is included in an electrical circuit 30. The circuit 30 further includes a power source 32, which is preferably the vehicle battery and/or a capacitor, and a normally open switch 34. The switch 34 is preferably part of a collision sensor 36 which senses a vehicle condition indicative of a collision for which inflation of the air bag 12 is desired to restrain an occupant of the seat 22. In the preferred embodiment of the present invention shown in the drawings, the air bag 12 is intended to restrain an occupant of the seat 22 upon the occurrence of a side impact collision, i.e., a collision in which an impact is directed against the vehicle in a direction transverse to the front-to-rear axis of the vehicle. Therefore, the collision-indicating condition that is sensed by the collision sensor 36 may comprise, for example, a predetermined amount of transverse vehicle acceleration and/or a predetermined amount of crushing of the door 18. The collision sensor 36 closes the switch 34 upon sensing such a collision-indicating condition. The inflator 14 is then actuated electrically.

When the inflator 14 is actuated in the foregoing manner, it emits a large volume of inflation fluid through a plurality of outlet openings 38. The reaction canister 24 directs the inflation fluid to flow from the outlet openings 38 into the air bag 12 to inflate the air bag 12 from a stored, folded condition (FIG. 1) to an inflated condition (FIG. 2). As the inflation fluid begins to inflate the air bag 12, it moves the air bag 12 outwardly against the deployment door 29. A stress riser (not shown) in the deployment door 29 ruptures under the stress induced by the increasing pressure of the inflation fluid flowing into the air bag 12. As the inflation fluid continues to inflate the air bag 12, is moves the air bag 12 outward past the ruptured deployment door 29 and into the vehicle occupant compartment 22, as shown in FIG. 2. The air bag 12 then extends into the vehicle occupant compartment 22 between the door 18 and an occupant of the seat 20 to restrain the occupant from forcefully striking the door 18 or other parts of the vehicle.

Figure 3:
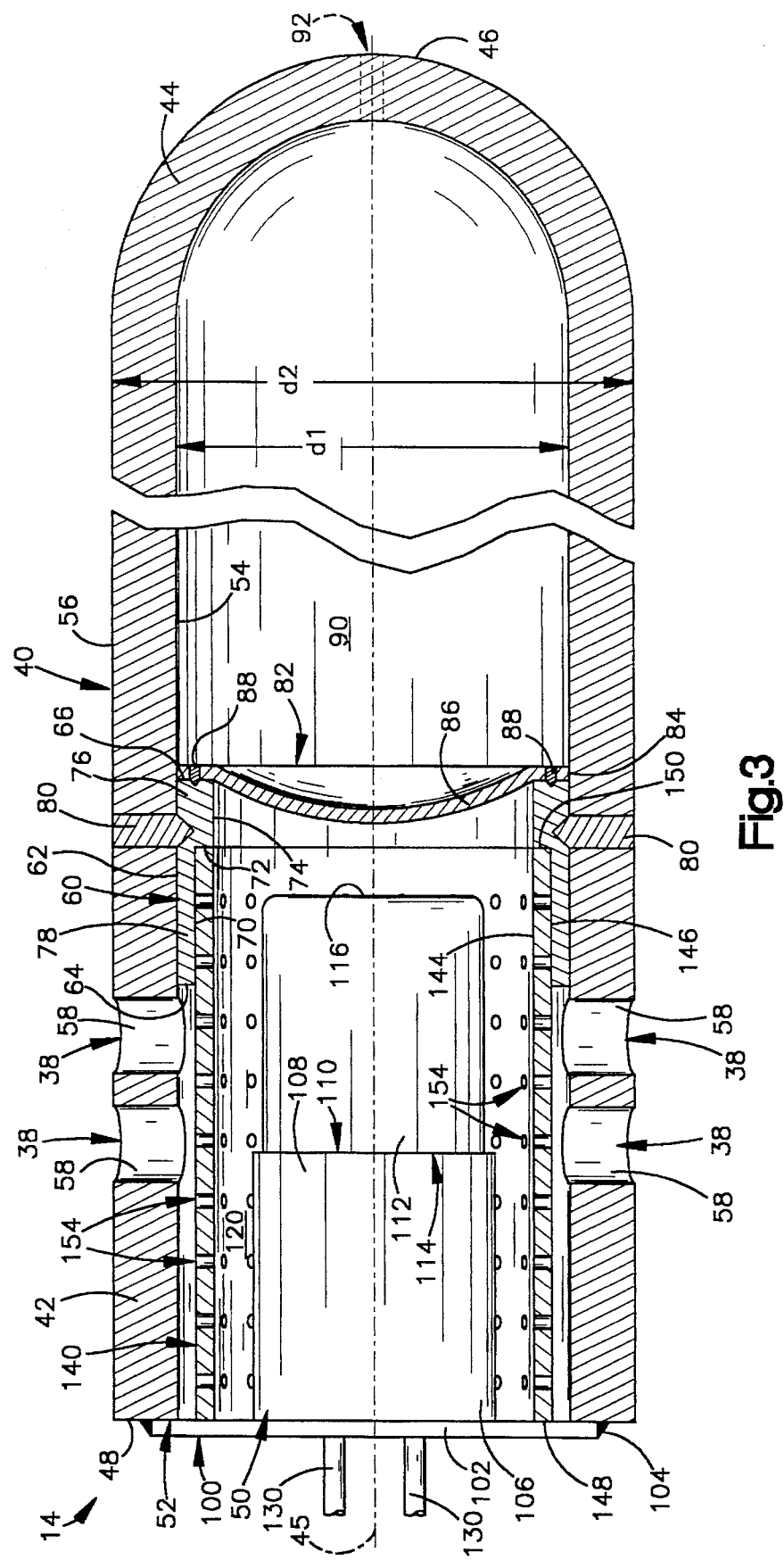
FIG. 3 is a side view, partly in section, showing parts of the apparatus of FIG. 1.

As shown in greater detail in FIG. 3, the inflator 14 includes an elongated tubular member 40. The tubular member 40 has a cylindrical portion 42 and a hemispherical portion 44, each of which is centered on a longitudinal central axis 45. The hemispherical portion 44 defines a closed end 46 of the tubular member 40. An annular end surface 48 defines a circular opening 50 centered on the axis 45, and thus defines an open end 52 of the tubular member 40. The cylindrical portion 42 of the tubular member 40 extends longitudinally from the open end 52 to the hemispherical portion 44.

The cylindrical portion 42 of the tubular member 40 has cylindrical inner and outer surfaces 54 and 56 with respective diameters d1 and d2 that are uniform along its entire length. A plurality of additional cylindrical surfaces 58 extend radially from the cylindrical inner surface 54 to the cylindrical outer surface 56. Each of the additional cylindrical surfaces 58 defines a respective one of the outlet openings 38. As indicated in FIGS. 1 and 2, the outlet openings 38 are arranged in a pair of parallel rows extending circumferentially entirely around the tubular member 40.

An annular support member 60 is contained within the tubular member 40 at a location axially between the outlet openings 38 and the closed end 46. As shown in FIG. 4, the support member 60 has a cylindrical outer surface 62 and a pair of annular opposite end surfaces 64 and 66, all of which are centered on an axis 68. A first cylindrical inner surface 70 of the support member 60 extends axially from the first end surface 64 to a narrow annular inner surface 72. The annular inner surface 72 is perpendicular to the axis 68. A second cylindrical inner surface 74 is spaced radially inward from the first cylindrical inner surface 70, and extends axially from the annular inner surface 72 to the second end surface 66. The diameter of the second cylindrical inner surface 74 is thus less than the diameter of the first cylindrical inner surface 70. Moreover, the length of the second cylindrical inner surface 74 is less than the length of the first cylindrical inner surface 70. Accordingly, the second cylindrical inner surface 74 defines the inner diameter and the length of a relatively short base portion 76 of the support member 60. In a similar manner, the first cylindrical inner surface 70 defines the inner diameter and the length of a relatively long sleeve portion 78 of the support member 60.

The diameter of the cylindrical outer surface 62 of the support member 60 is substantially equal to the diameter d1 (FIG. 3) of the cylindrical inner surface 54 of the tubular member 40. The support member 60 is thus received closely and coaxially within the cylindrical portion 42 of the tubular member 40, as shown in FIG. 3. A continuous weld 80 fixes and seals the support member 60 to the tubular member 40. Alternatively, a different arrangement of welds and/or other suitable fastening structures could be used to fix and seal the support member 60 to the tubular member 40.

A rupturable closure wall 82 also is contained within the tubular member 40 at a location axially between the outlet openings 38 and the closed end 46. The closure wall 82 is shaped as a disc with an annular peripheral portion 84 and a circular central portion 86. The annular peripheral portion 84 of the closure wall 82 abuts the second annular end surface 66 of the support member 60, and is fixed and sealed to the support member 60 by a continuous weld 88. As noted above with reference to the weld 80, any suitable alternative fastening structure could be used to fix and seal the closure wall 82 to the support member 60. The central portion 86 of the closure wall 82 extends diametrically across the axis 45, and has a concave contour facing axially inward toward the closed end 46 of the tubular member 40. The closure wall 82 thus defines, and closes, the axially outer end of a storage chamber 90 which occupies the volume of the tubular member 40 axially inward of the closure wall 82.

The storage chamber 90 is filled with inflation fluid for inflating the air bag 12 (FIGS. 1 and 2). The inflation fluid is contained in the storage chamber 90 at an elevated pressure, and may have any suitable composition known in the art. An inlet opening 92 for directing the inflation fluid into the storage chamber 90 is located in the hemispherical portion 44 of the tubular member 40. The inlet opening 92 is closed and sealed in a known manner when the storage chamber 90 has been filled with the inflation fluid at the elevated pressure.

The inflator 14 also includes an initiator 100. The initiator has a circular base 102 centered on the axis 45. The base 102 extends across the opening 50 at the open end 52 of the tubular member 40, and further extends radially outward over a portion of the annular end surface 48 of the tubular member 40. A weld 104 extends circumferentially entirely around the periphery of the base 102 at the juncture of the base 102 and the end surface 48. The base 102 of the initiator 100 is thus fixed to the tubular member 40 so as to close the open end 52 of the tubular member 40, and thereby to block the flow of inflation fluid outward through the opening 50.

The initiator 100 further has a cylindrical casing 106 which projects axially from the base 102 into the tubular member 40. The casing 106 thus extends coaxially within the cylindrical portion 42 of the tubular member 40 at a location axially between the closure wall 82 and the open end 52 of the tubular member 40. A first cylindrical wall portion 108 of the casing 106 defines the length and diameter of a first section 110 of the casing 106. A second cylindrical wall portion 112 of the casing 106 similarly defines the length and diameter of a second, slightly narrower section 114 of the casing 106. The second section 114 includes a circular inner end wall 116 of the casing 106.

The cylindrical wall portions 108 and 112 of the casing 106 define radially inner boundaries of a fluid flow space 120 which extends radially outward from the casing 106 to the cylindrical inner surface 54 of the tubular member 40. The fluid flow space 120 extends axially between the central portion 86 of the closure wall 82 and the inner end wall 116 of the casing 106, and further extends axially over the casing 106 to the base 102 of the initiator 100.

The initiator 100 contains pyrotechnic materials (not shown) which are ignited in a known manner upon the passage of electric current through the initiator 100 between a pair of lead wires 130. A first pyrotechnic material, preferably $ZrKClO_4$, is contained in the first section 110 of the casing 106. A second pyrotechnic material, preferably $BKNO_3$, is contained in the second section 114 of the casing 106.

The inflator 14 further includes a filter 140. As shown in FIG. 5, the filter 140 is an elongated, tubular cylindrical part with a longitudinal central axis 142. The filter 140 has cylindrical inner and outer surfaces 144 and 146, and has annular opposite end surfaces 148 and 150, all of which are centered on the axis 142.

A plurality of smaller cylindrical surfaces 152 extend radially through the filter 140 from the cylindrical inner surface 144 to the cylindrical outer surface 146. Each of the smaller cylindrical surfaces 152 defines a respective filtration opening 154 which extends radially through the filter 140. Each of the filtration openings 154 in the filter 140 is substantially smaller than each of the outlet openings 38 in the tubular member 40. The filtration openings 154 are closely spaced from each other in parallel rows 156 extending axially along nearly the entire length of the filter 140. The rows 156 of filtration openings 154 are, in turn, closely spaced from each other in an array extending circumferentially entirely around the filter 140. Preferably, the filter 140 is formed by perforating a sheet of metal to form the filtration openings 154, and by welding the opposite longitudinal edges (not shown) of the sheet together to form the filter 140 as a thin-walled cylinder.

As shown in FIG. 3, the filter 140 is located coaxially within the cylindrical portion 142 of the tubular member 40. The filter 140 is thus located in the fluid flow space 120 concentrically between the igniter casing 106 and the cylindrical inner surface 54 of the tubular member 40. The first end surface 148 of the filter 140 abuts the base 102 of the initiator 100. The second end surface 150 of the filter 140 abuts the annular inner surface 72 on the support member 60. An adjacent portion of the cylindrical outer surface 146 of the filter 140 abuts the first cylindrical inner surface 70 of the support member 60. Additionally, the cylindrical inner surface 144 of the filter 140 is flush with the second cylindrical inner surface 74 of the support member 60.

One or more welds may be used to connect the filter 140 rigidly to the support member 60 and/or to the initiator base 102. However, in the preferred embodiment of the present invention shown in the drawings, the filter 140 fits closely and firmly against the support member 60 and the initiator base 102 in abutting surface contact. The filter 140 is thus constrained from rattling or vibrating excessively relative to those parts of the inflator 14.

When the inflator 14 is actuated electrically upon the occurrence of a vehicle collision, as described above, electric current is directed through the initiator 100 between the lead wires 130. The pyrotechnic materials in the casing 106 are then ignited and emit combustion products including heat and hot particles. The combustion products rupture the inner end wall 116 of the casing 106 and are spewed axially outward from the casing 106 toward the closure wall 82. The combustion products then rupture the central portion 86 of the closure wall 82, and the inflation fluid in the storage chamber 90 is released to flow outward from the storage chamber 90 and through the fluid flow space 120 to the outlet openings 38.

As the inflation fluid emerges from the storage chamber 90, it is heated and expanded by the combustion products emitted from the initiator 100. This occurs primarily as the inflation fluid flows throughout the fluid flow space 120, and occurs to a lesser extent in the storage chamber 90 as the inflation fluid encounters the combustion products upon exiting the storage chamber 90. As a result, the inflation fluid emerges from the outlet openings 38 in the tubular member 40 at a flow rate that is higher than it would be if the inflation fluid were not heated.

When the combustion products emitted from the initiator 100 mix with the inflation fluid to heat and expand the inflation fluid in the foregoing manner, the flow developed by the pressure of the inflation fluid tends to carry the particulate combustion products toward the outlet openings 38 in the tubular member 40. However, the filtration openings 154 in the filter 140 are sized to block the passage of the particulate combustion products radially outward through the filter 140 with the inflation fluid. The inflation fluid is thus filtered as it flows through the fluid flow space 120 toward the outlet openings 38.

From the above description of the invention, those skilled in the art will perceive improvements, changes and modifications. For example, the air bag module 16 in the preferred embodiment of the present invention is mounted on the vehicle door 18, but could alternatively be mounted at another location from which the air bag 12 is inflated into the vehicle occupant compartment 22 between the door 18 and an occupant of the vehicle. Such improvements, changes and modifications within the skill of the art are intended to be covered by the appended claims.

Having described the invention, the following is claimed:

1. Apparatus comprising:
    an elongated tubular member having a longitudinal central axis and an annular end surface defining an open end of said tubular member centered on said axis, said tubular member further having a closed end portion and a plurality of outlet openings;

a support member fixed to said tubular member at a location axially between said outlet openings and said closed end portion;

a rupturable closure wall fixed to said support member;

a quantity of inflation fluid contained under pressure within said tubular member between said closure wall and said closed end portion;

initiator means for releasing said inflation fluid to flow outward through said outlet openings, said initiator means including an initiator containing pyrotechnic material which, when ignited, produces combustion products which rupture said closure wall, said initiator having a base extending across said open end of said tubular member to close said open end of said tubular member; and filter means for blocking the passage of particulate combustion products through said outlet openings, said filter means comprising a tubular cylindrical filter having an axially inner end portion abutting said support member and an axially outer end portion abutting said base of said initiator.

2. Apparatus as defined in claim 1 wherein said filter has a plurality of filtration openings extending radially through said filter, said filtration openings being arranged in rows which extend axially along said filter.

3. Apparatus as defined in claim 2 wherein each of said filtration openings is substantially smaller than each of said outlet openings.

4. Apparatus as defined in claim 1 further comprising an inflatable vehicle occupant restraint, reaction canister means for directing said inflation fluid from said outlet openings into said restraint to inflate said restraint, a vehicle seat adjacent to a vehicle door, and means for supporting said restraint at a location from which said restraint moves into a space between said door and said seat upon inflation of said restraint.

5. Apparatus comprising:

an elongated tubular member having a longitudinal central axis and an annular end surface defining an open end of said tubular member centered on said axis, said tubular member further having a closed end portion and a cylindrical portion extending axially from said open end to said closed end portion, said cylindrical portion having a plurality of outlet openings;

a rupturable closure wall supported within said cylindrical portion of said tubular member at a location axially between said outlet openings and said closed end portion, said closure wall being fixed to said tubular member;

a quantity of inflation fluid contained under pressure within said tubular member between said closure wall and said closed end portion;

initiator means for releasing said inflation fluid to flow outward through said outlet openings, said initiator means including a casing containing pyrotechnic material which, when ignited, produces combustion products which rupture said closure wall, said casing extending within said tubular member at a location axially between said closure wall and said open end of said tubular member;

means for closing said open end of said tubular member;

said casing defining boundaries of a fluid flow space extending axially from said closure wall to said casing and radially from said casing to said outlet openings, said inflation fluid being released to flow throughout said fluid flow space when said closure wall is ruptured;

said combustion products including hot particles, said apparatus further comprising filter means for blocking the passage of said particles through said outlet openings, said filter means comprising a tubular cylindrical filter located in said fluid flow space concentrically between said cylindrical casing and said cylindrical portion of said tubular member;

said cylindrical casing being part of an initiator having a circular base from which said casing projects axially; and said means for closing said open end of said tubular member comprising a peripheral portion of said circular base which overlies said annular end surface of said tubular member, said fluid flow space extending axially from said circular base to said closure wall.

6. Apparatus as defined in claim 5 further comprising an annular support member closely received coaxially within said tubular member at a location axially between said outlet openings and said closed end portion, said support member being fixed to said tubular member, said closure wall being fixed to said support member.

7. Apparatus as defined in claim 6 wherein said filter has an axially inner end portion abutting said support member and an axially outer end portion abutting said circular base.

8. Apparatus comprising:

an elongated tubular member having a longitudinal central axis, an open end, a closed end portion, and a plurality of outlet openings;

a rupturable closure wall fixed to said tubular member at a location axially between said outlet openings and said closed end portion;

a quantity of inflation fluid contained under pressure within said tubular member between said closure wall and said closed end portion; and initiator means for releasing said inflation fluid to flow outward through said outlet openings, said initiator means including a casing containing pyrotechnic material which, when ignited, produces combustion products which rupture said closure wall, said casing extending within said tubular member at a location axially between said closure wall and said open end of said tubular member;

said casing partially defining boundaries of a fluid flow space extending axially from said closure wall to said casing and radially from said casing to said outlet openings, said inflation fluid being released to flow throughout said fluid flow space when said closure wall is ruptured; and said casing being part of an initiator having a base from which said casing projects along said axis, said base extending across said open end of said tubular member to close said open end, said fluid flow space extending axially from said base to said closure wall.

9. Apparatus as defined in claim 8 wherein said combustion products include hot particles, said apparatus further comprising filter means for blocking the passage of said particles through said outlet openings, said filter means comprising a tubular filter located in said fluid flow space concentrically between said casing and said tubular member.

10. Apparatus as defined in claim 9 wherein said casing is cylindrical and extends coaxially within said tubular member.

11. Apparatus as defined in claim 8 further comprising an inflatable vehicle occupant restraint, reaction canister means for directing said inflation fluid from said outlet openings into said restraint to inflate said restraint, a vehicle seat adjacent to a vehicle door, and means for supporting said restraint at a location from which said restraint moves into a space between said door and said seat upon inflation of said restraint.

12. Apparatus comprising:

an elongated tubular member having a longitudinal central axis and an annular end surface defining an open end of said tubular member centered on said axis, said tubular member further having a closed end portion and a cylindrical portion extending axially from said open end to said closed end portion, said cylindrical portion having a uniform inner diameter and a plurality of outlet openings;

an annular support member closely received coaxially within said tubular member at a location axially between said outlet openings and said closed end portion, said support member being fixed to said tubular member;

a rupturable closure wall fixed to said annular support member, said closure wall extending entirely across said inner diameter of said cylindrical portion of said tubular member, said closure wall being rupturable to create an opening which is substantially equal in diameter to the inner diameter of said annular support member;

a quantity of inflation fluid contained under pressure within said tubular member between said closure wall and said closed end portion;

initiator means for releasing said inflation fluid to flow outward through said outlet openings, said initiator means including a casing containing pyrotechnic material which, when ignited, produces combustion products which rupture said closure wall, said casing extending within said tubular member at a location axially between said closure wall and said open end of said tubular member; and means for closing said open end of said tubular member.

13. Apparatus as defined in claim 12 further comprising an inflatable vehicle occupant restraint, reaction canister means for directing said inflation fluid from said outlet openings into said restraint to inflate said restraint, a vehicle seat adjacent to a vehicle door, and means for supporting said restraint at a location from which said restraint moves into a space between said door and said seat upon inflation of said restraint.

14. Apparatus comprising:

an elongated tubular member having a longitudinal central axis and an annular end surface defining an open end of said tubular member centered on said axis, said tubular member further having a closed end portion and a plurality of outlet openings;

an annular support member fixed to said tubular member at a location axially between said outlet openings and said closed end portion;

a rupturable closure wall fixed to said annular support member;

a quantity of inflation fluid contained under pressure within said tubular member between said closure wall and said closed end portion;

initiator means for releasing said inflation fluid to flow outward through said outlet openings, said initiator means including an initiator containing pyrotechnic material which, when ignited, produces combustion products which rupture said closure wall;

closing means for closing said open end of said tubular member; and filter means for blocking the passage of particulate combustion products through said outlet openings, said filter means comprising a tubular cylindrical filter having an axially inner end portion abutting said annular support member and an axially outer end portion abutting said closing means, said tubular cylindrical filter having an inner diameter which is substantially equal to the inner diameter of said annular support member.

15. Apparatus comprising:

an elongated tubular member having a longitudinal central axis and an annular end surface defining an open end of said tubular member centered on said axis, said tubular member further having a closed end portion and a cylindrical portion extending axially from said open end to said closed end portion, said cylindrical portion having a uniform inner diameter and a plurality of outlet openings;

a rupturable closure wall supported within and fixed to said cylindrical portion of said tubular member at a location axially between said outlet openings and said closed end portion, said closure wall extending entirely across said inner diameter of said cylindrical portion of said tubular member;

a quantity of inflation fluid contained under pressure within said tubular member between said closure wall and said closed end portion;

initiator means for releasing said inflation fluid to flow outward through said outlet openings, said initiator means including a casing containing pyrotechnic material which, when ignited, produces combustion products which rupture said closure wall, said casing extending within said tubular member at a location axially between said closure wall and said open end of said tubular member; and means for closing said open end of said tubular member;

wherein, prior to the ignition of said initiator means, said casing defines boundaries of a fluid flow space extending axially without interruption from said closure wall to said casing and radially from said casing to said outlet openings, said inflation fluid being released to flow throughout said fluid flow space when said closure wall is ruptured.

16. Apparatus as defined in claim 15 wherein said combustion products include hot particles, said apparatus further comprising filter means for blocking the passage of said particles through said outlet openings, said filter means comprising a tubular cylindrical filter located in said fluid flow space concentrically between said cylindrical casing and said cylindrical portion of said tubular member, said filter providing a flowpath for said inflation fluid to flow radially in said fluid flow space.

17. Apparatus as defined in claim 16 wherein said filter has a plurality of filtration openings extending radially through said filter, said filtration openings being arranged in parallel rows which extend axially along said filter, said rows extending circumferentially around said filter, each of said filtration openings being substantially smaller than each of said outlet openings, said filter being formed by perforating a sheet of metal to form said plurality of filtration openings and then welding the opposite longitudinal edges of said sheet together.

* * * * *